US00RE41698E

(19) United States
(12) Reissued Patent
Chiang et al.

(10) Patent Number: US RE41,698 E
(45) Date of Reissued Patent: Sep. 14, 2010

(54) BOX ADAPTOR WITH A REVOLVABLE SOCKET DOME

(76) Inventors: Yi-Te Chiang, No. 13, Alley 70, Lane 180, Yuan Chi Road, Taipei (TW); Hsueh-Lan Lin, 1F, No. 11, Alley 20, Lane 318, Sec.2, Chung Shan Road, Pan Chiao City, Taipei Hsien (TW)

(21) Appl. No.: 11/584,798

(22) Filed: Oct. 19, 2006

Related U.S. Patent Documents

Reissue of:
(64) Patent No.: 6,805,565
Issued: Oct. 19, 2004
Appl. No.: 10/668,146
Filed: Sep. 24, 2003

(30) Foreign Application Priority Data

Jun. 12, 2003 (CN) ..... 03 1 43023

(51) Int. Cl.
*H01R 3/00* (2006.01)

(52) U.S. Cl. ..... 439/162; 439/11; 439/640

(58) Field of Classification Search ..... 439/162, 439/11, 640, 164

See application file for complete search history.

(56) References Cited

U.S. PATENT DOCUMENTS 2,652,546 A * 9/1953 Christner ..... 439/8
4,688,478 A * 8/1987 Williams ..... 99/503
6,015,307 A * 1/2000 Chiu et al. ..... 439/139
6,089,921 A * 7/2000 Chou ..... 439/640
6,296,227 B1 * 10/2001 Burcham et al. ..... 251/30.03

FOREIGN PATENT DOCUMENTS

CN 2499999 7/2002
CN 2521791 11/2002

* cited by examiner

*Primary Examiner*—Jean F Duverne
(74) *Attorney, Agent, or Firm*—Workman Nydegger

(57) ABSTRACT

A box adaptor with a revolvable socket dome is introduced to have a housing and at least a dome structure. The housing further include a bracket plate. The dome structure further includes a collar shaft at one end for forming a revolvable pair with the bracket plate and a dome surface at another end. At least a socket is constructed to a rim of the dome surface, with a facing direction perpendicular to the dome surface. By providing the engagement of the collar shaft and the bracket plate, the socket can change its facing direction as the respective dome structure revolves about the bracket plate.

16 Claims, 5 Drawing Sheets

BOX ADAPTOR WITH A REVOLVABLE SOCKET DOME

Matter enclosed in heavy brackets [ ] appears in the original patent but forms no part of this reissue specification; matter printed in italics indicates the additions made by reissue.

BACKGROUND OF THE INVENTION (1) Field of the Invention

The invention relates to a box adaptor, and more particularly to a communication adaptor which has a revolvable socket dome.

(2) Description of the Prior Art

In the information age, the knowledge or information flow does highly depend on networking, which includes existing telnet, cable net and fiber net. Typically, taking a telnet for example, the telnet reaches individual family by a form of a wall plate having a receiving socket constructed on an interior wall. The wall plate is then performed as a terminal of the far-side telnet for domestic extension usage.

Referring to FIG. 1, a communication connector pair 10 as shown includes a wall plate 12 to be fixed to an interior wall by screws 14. A socket 16 is formed on the wall plate 12 and has a door thereof flush with the exterior surface of the wall plate 12. A plurality of gold-plated contacts 18 are constructed inside the socket 16, for coupling with signal wires shielded inside a cord 17 at an opposing plug 15. The engagement of the signal wires and the respective gold-plated contacts 18 are done by mating the plug 15 and the socket 16. In application, while a communication system/equipment (not shown) as a telephone or a computer, for example, is ready to be hooked up with a foreign communication system/network, the communication can be simply established by introducing the plug 15 of an extension cord from the equipment to the socket 16 designated as a terminal of the foreign network; i.e. by forming a foregoing connector pair 10 as shown in FIG. 1.

Nevertheless, the aforesaid communication connector pair 10 still has the following disadvantage.

It is apparent that the position, height and facing of the socket are fixed as long as the wall plate is mounted. However, for the communication systems in a reachable region of the wall plate is not stationary but can be moved at any time. Therefore, the cord and plug of the domestic communication system that lead to engage with the socket of the wall plate may also change their incoming direction and angling accordingly. No matter what the incoming angling of the plug is with respect to the socket, the facing direction of the socket is always perpendicular to the wall plate which is further mounted to a wall or a floor. Upon such an arrangement, a substantial bending will result in the cord at a location close to the plug as well as the engaged socket, for the layout of the cord does always follow the comers of the wall.

As stated above, conventional communication connector pair usually causes disadvantage bending to the cord of the domestic communication system which, after a period of service time, will lead to the fatigue of the cord 12 and thus make wires in the cord break and signal quality of the cord degraded. Therefore, a preferred resort to overcome the aforesaid problem is always welcome in the art, and thereby, hopefully, the communication quality can be ensured.

SUMMARY OF THE INVENTION

Accordingly, it is a primary object of the present invention to provide a box adaptor with a revolvable socket dome which can alter the facing of its own communication sockets so as to engage the incoming plugs as well as the cord at a less-bending state.

The box adaptor with a revolvable socket dome in accordance with the present invention can include a housing, at least a dome structure, and at least a socket. The housing having a surface bracket plate can be fastened to a proper object by a plurality of screws or other fasteners, in which the object can be a wall, a floor, a desk or any the like.

Each of the dome structure mounted through a respective hole of the bracket plate has a collar shaft to make the dome structure rotatable about the bracket plate, i.e. rotatable on the housing. The surface of the dome structure that exposes over the bracket plate is formed as a dome surface. The socket of the present invention is then located at a predetermined location on the dome surface and have its facing perpendicular to a chip-off portion of the dome surface.

By providing revolvability of the dome structure on the housing, the box adaptor of the present invention can then prepare the socket to face at a preferable direction for receiving an incoming plug. Also, by such an arrangement, bending upon the cord connecting the engaged plug can be reduced to a minimum. Thereby, service life of the cord can be prolonged and thus the signal transmission quality can be improved.

All these objects are achieved by the box adaptor with a revolvable socket dome described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a box adaptor with a revolvable socket dome. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
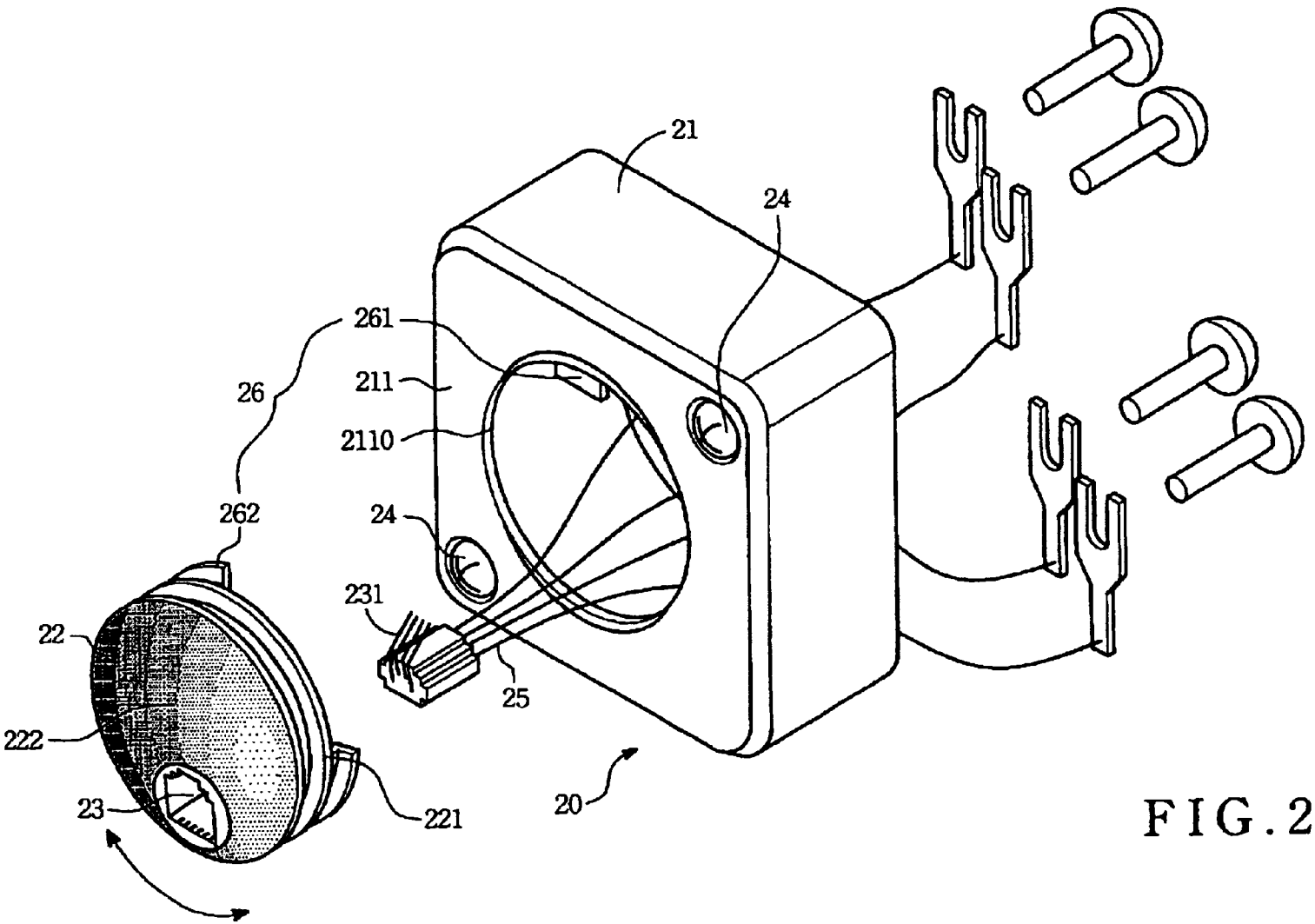
FIG. 2 is an exploded perspective view of a first embodiment of the box adaptor with a revolvable socket dome in accordance with the present invention.

Referring now to FIG. 2, a first embodiment of the box adaptor with a revolvable socket dome in accordance with the present invention is shown explodedly. The box adaptor 20 can include a housing 21, a dome structure 22 and a socket 23. The housing 21 can be fastened to a proper object by a plurality of screws or other fasteners, in which the object can be a wall, a floor, or any place that constructs cord extended from a foreign communication net. In addition, the housing 21 also includes a surface bracket plate 211 which further includes a center hole 2110 for the dome structure 22 to be mounted therethrough.

The dome structure 22 mounted through the hole 2110 of the bracket plate 211 has a collar shaft 221 at one end and a dome surface 222 at another end. The collar shaft 221 pairs with the hole 2110 of the bracket plate 211 of the housing 21 so as to make the dome structure 22 turnable about the bracket plate 211. In the art, various mechanisms can be adopted to construct the rotational pair of the bracket plate 211 and the dome structure 22. For example, internal thread can be construct to the hole 2110 of the bracket plate 211 while respective external thread is formed to the collar shaft 221 of the dome structure 22. For another example, circular grooves can be construct to the hole 2110 of the bracket plate 211 while respective circular racks are formed to the collar shaft 221 of the dome structure 22.

In addition, to avoid possible broken wires inside the signal wire 25 [resulted] *resulting* from the rotation of the dome structure 22, a stopper pair 26 is provided to define the rotation reign of the dome structure 22 with respect to the housing 21. The stopper pair 26 can include a stopper 261 and a respective stopper collar 262. The stopper 261 as shown is constructed under the bracket plate 211 while the stopper collar 262 is constructed at a respective location of the collar shaft 221. Upon such an arrangement, in the case that the dome structure 22 is turned to a predetermined angle, the stopper collar 262 will meet the stopper 261 and thus prevent the dome structure 22 from further rotating. Preferably, the rotation reign of the dome structure 22 with respect to the bracket plate 211 is within 360 [degree] *degrees*. That is to say that the dome structure 22 is expected to be able to rotate a maximum *of* 180 [degree] *degrees* in either clockwise or counter-clockwise direction.

Figure 3B:
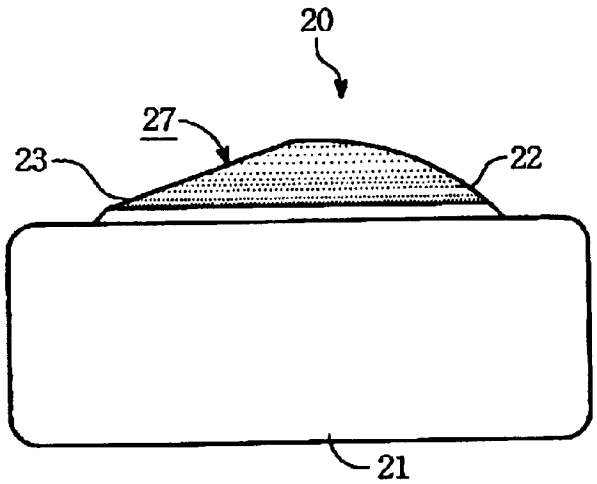
FIG. 3B is a side view of FIG. 3A from a direction A.
Figure 3A:
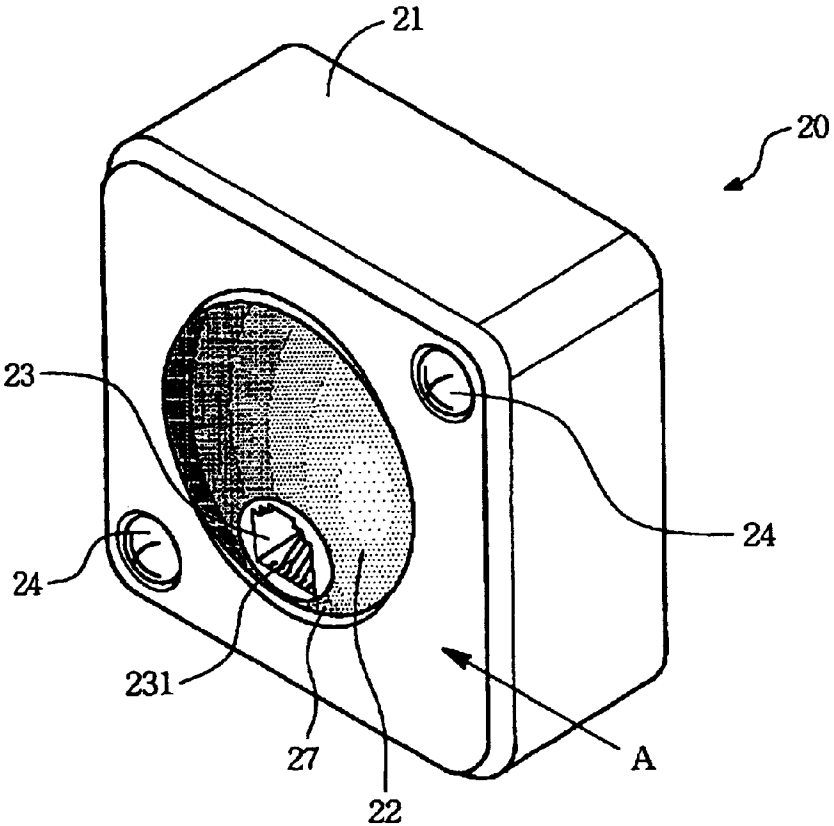
FIG. 3A is an assembled perspective view of FIG. 2.

Referring now to FIG. 3A and FIG. 3B, the socket 23 of the present invention is constructed close to a rim of the dome structure 22. Preferably, the facing of the socket 23 is perpendicular to a local dome surface 222. To better achieve the design of the socket 23, the local dome surface 222 for constructing the socket 23 is preferred to formed as a chip-off portion 27 of the dome structure 22 as shown in FIG. 3B. The socket 23 further includes a plurality of contact terminals 231 thereinside for establishing electrically coupling with an incoming plug of a domestic communication system at one end, and for extending to connect electrically with a foreign communication net through the signal wire 25 at another end.

Figure 4:
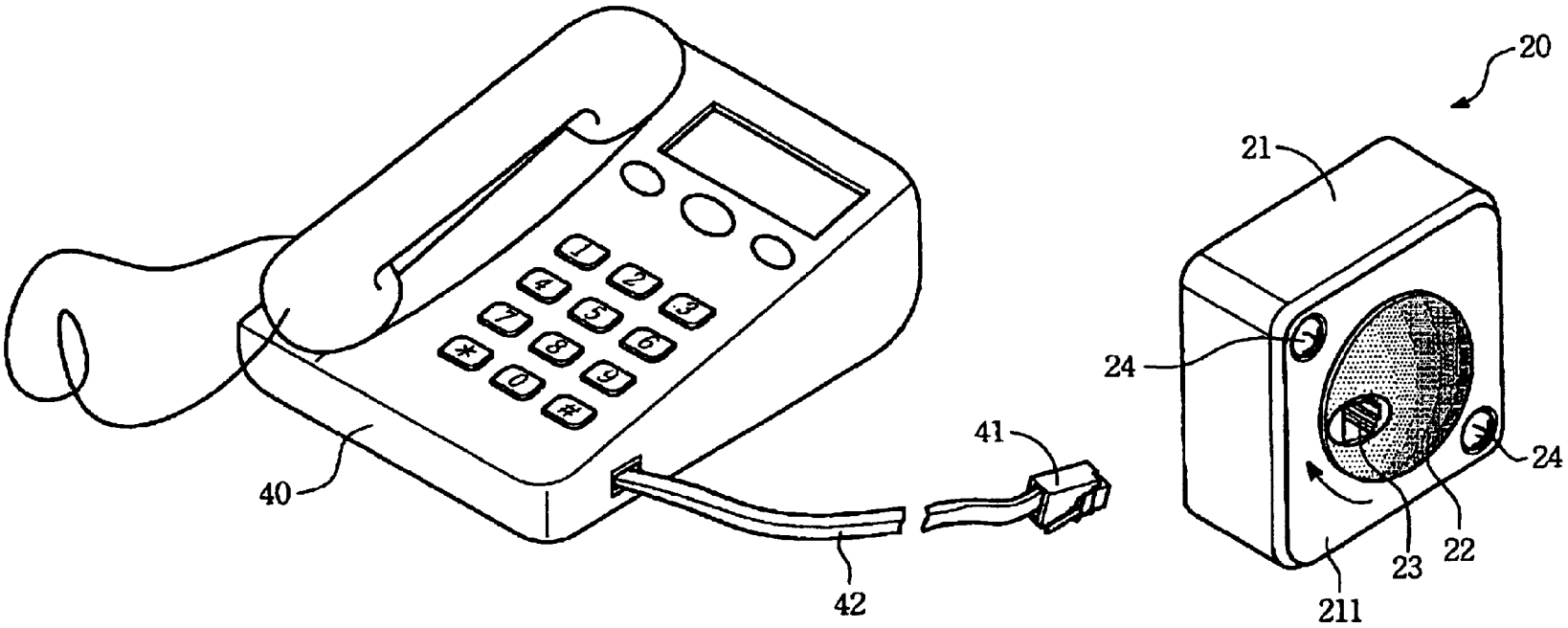
FIG. 4 is a schematic perspective view to show separately the box adaptor of FIG. 2 and a domestic communication system.

Referring now to FIG. 4, in the case that a domestic communication system or equipment 40 is targeted to connect with a foreign communication net through the box adaptor 20 of the present invention, the plug 41 extending from the domestic communication equipment 40 by a cord 42 is introduced to the socket 23 of the dome structure 22 for establishing electrically connection in between. In the present invention, the dome structure 22 can revolve in the box adaptor 20 so that the socket 23 of the dome structure 22 can be adjusted to a favorite facing direction for easily receiving the incoming plug 41 by turning the dome structure 22 about the bracket plate 211.

Figure 1:
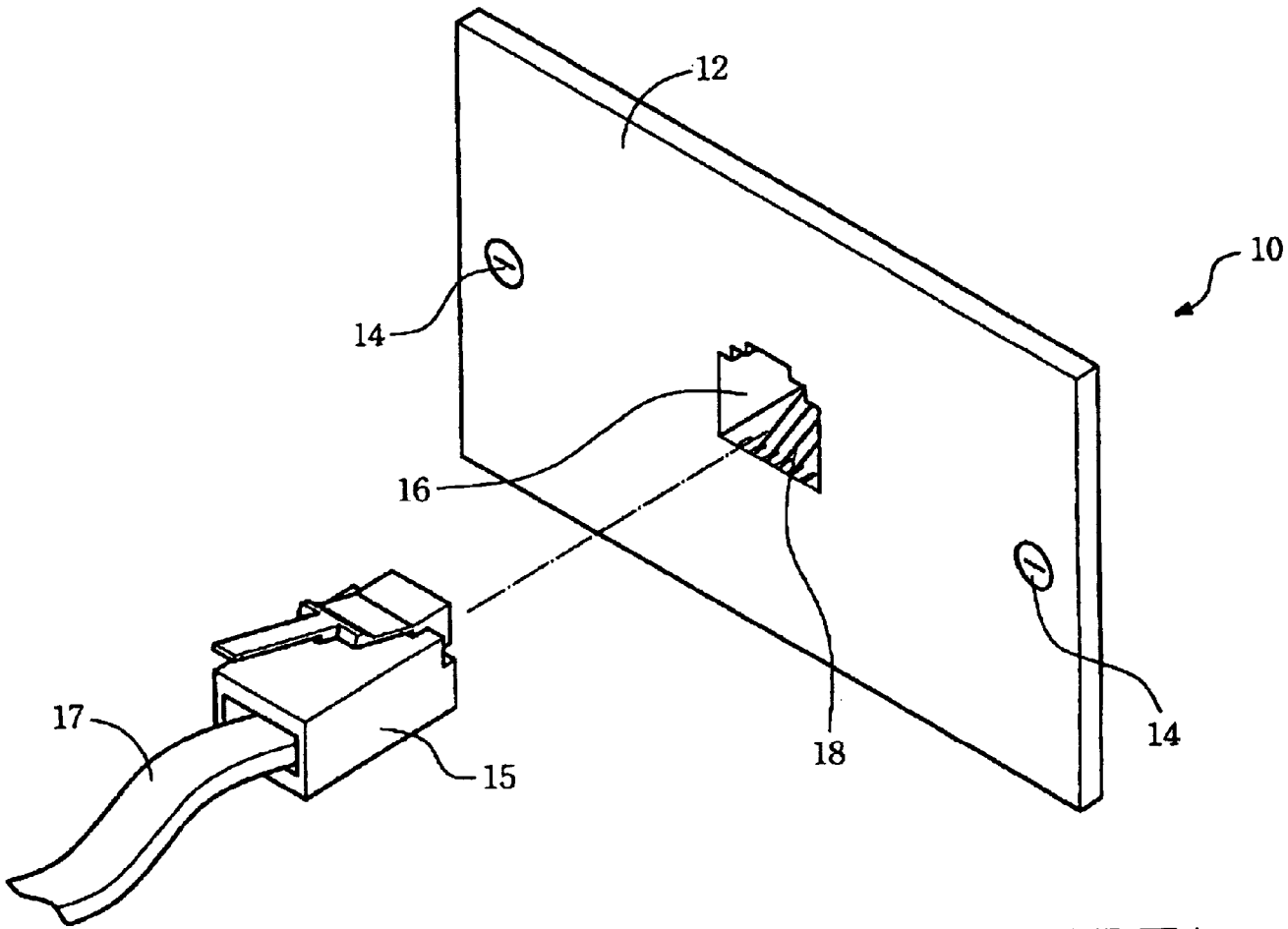
FIG. 1 (PRIOR ART)
FIG. 1 is a perspective view of a disengaged conventional communication connector pair.

As stated above, providing the revolvabilty of the dome structure 22 over the box adaptor 20, the mating of the plug 41 of the domestic communication equipment 40 and the socket 23 of the box adaptor 20 can then make less harm to the cord 42. Definitely, compared with the conventional design shown in FIG. 1, the bending within the cord 42 caused by angling the cord 42 for plugging can be optimally reduced.

Thereby, the service life of the cord 42 can be prolonged and the signal flow within thereof can be much smoother.

Furthermore, as the rapid development in the communication industry, it is quite often that, in a restrict area, various communication systems/equipments need to connect with an identical foreign communication net. At this time, it is inevitable to arrange these communication equipments to connect in parallel to the same communication socket of the foreign communication net. To make easily aforesaid parallel arrangement, a second embodiment of the box adaptor with a revolvable socket dome in accordance with the present invention is introduced to provide such parallel splitting in signals.

Figure 5:
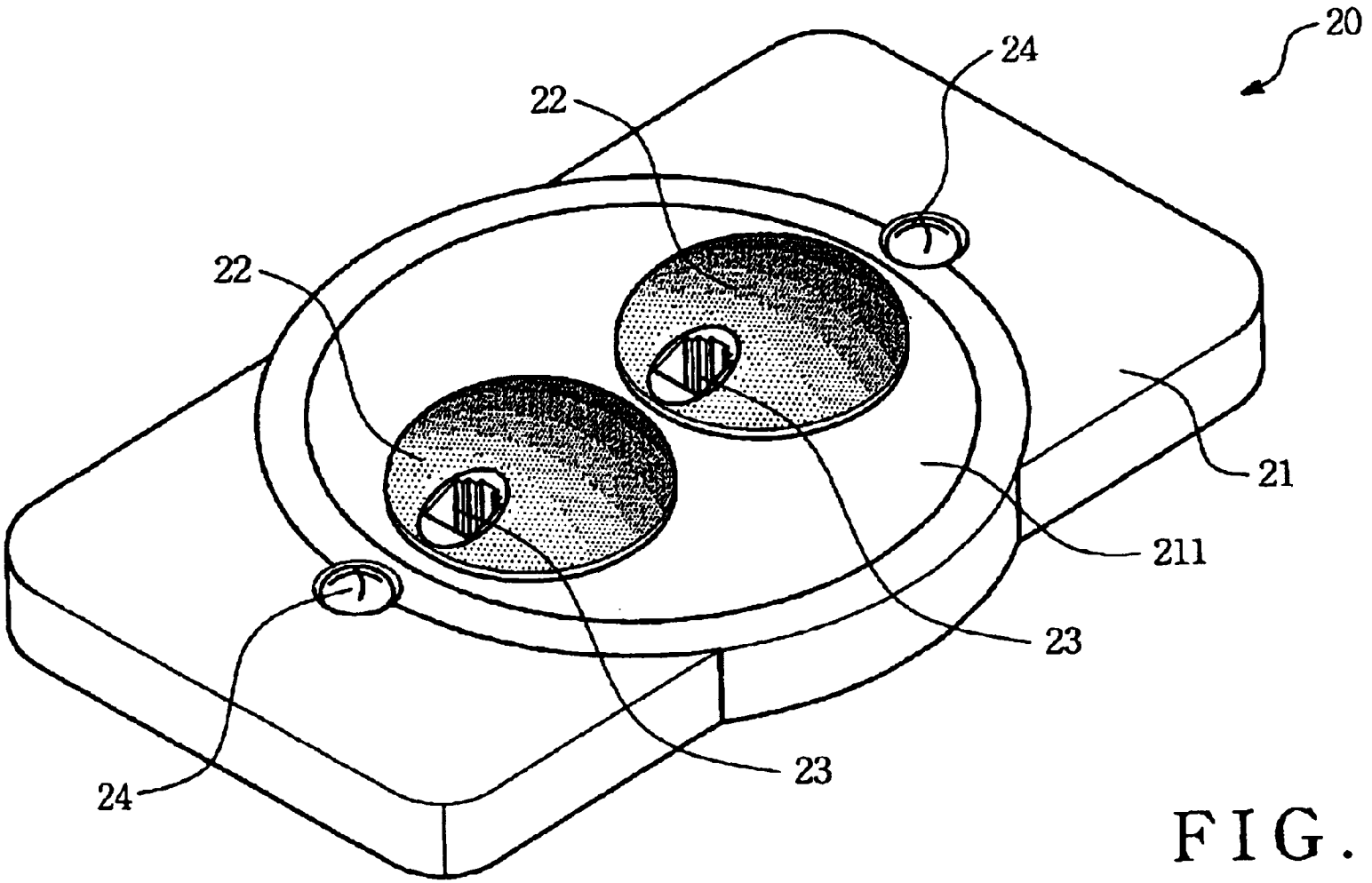
FIG. 5 is a perspective view of a second embodiment of the box adaptor with a revolvable socket dome in accordance with the present invention.

Referring now to FIG. 5, the second embodiment of the present invention is perspective shown, in which two dome structures 22 are constructed on the housing 21 and each of the dome structure 22 provides a socket 23.

The housing 21 of the box adaptor 20 of FIG. 5 can also apply several screws 24 at proper location to be mounted to a predetermined object. Because the construction of each dome structure 22 over the bracket plate 211 and the related wiring are the same as those described in the first embodiment of FIG. 2, details of the second embodiment will be omitted herein.

Definitely, various embodiments can then be obvious to the skilled person in the art by learning the foregoing description upon the present invention. Such variations can be multiple dome structures on a single bracket plate, multiple sockets in a single dome structure, multiple dome structures on multiple bracket plates, and so on.

By providing the present invention, the bending on the cord of the incoming plug for the socket can then be reduced, and thus possible damage from the bending can be better avoided. Also, by providing multiple sockets to the box adaptor of the present invention can increase the applicability of the communication socket of the foreign communication net.

While the present invention has been particularly shown and described with reference to a preferred embodiment, it will be understood by those skilled in the art that various changes in form and detail may be without departing from the spirit and scope of the present invention.

We claim:

1. A box adaptor with a revolvable socket dome, comprising:

a housing, further including thereof a bracket plate; and at least a dome structure, mounted individually and revolvably at said bracket plate, each of said dome structure further having a collar shaft at one end and a dome surface at another end, said collar shaft engaging with said bracket plate to form a revolvable pair, each of said dome structure further having thereof at least a socket;

wherein each of said socket changes its facing direction as said respective dome structure revolves about said bracket plate.

2. The box adaptor with a revolvable socket dome according to claim 1, wherein said housing is fixed to a predetermined object by a plurality of screws.

3. The box adaptor with a revolvable socket dome according to claim 1, wherein said collar shaft further includes external thread and said bracket plate further includes respective internal thread for meshing with said external thread of said collar shaft.

4. The box adaptor with a revolvable socket dome according to claim 1, wherein said collar shaft further includes a groove and said bracket plate further includes respective rack for meshing with said groove of said collar shaft.

5. The box adaptor with a revolvable socket dome according to claim 1, wherein a stopper pair is constructed between said dome structure and said bracket plate for defining a rotation reign of said dome structure with respect to said housing, said stopper pair further including a stopper and a respective stopper collar, said stopper constructed under said bracket plate while said stopper collar constructed at a respective location of said collar shaft; in the case that said dome structure being turned to a predetermined angle, said stopper collar meeting said stopper and thus preventing said dome structure from further rotating.

6. The box adaptor with a revolvable socket dome according to claim 5, wherein said rotation reign is 360 [degree] *degrees*.

7. The box adaptor with a revolvable socket dome according to claim 1, wherein said dome structure further includes a chip-off portion that defines said socket.

8. The box adaptor with a revolvable socket dome according to claim 1, wherein said socket further includes internally a plurality of contact terminals.

*9. A box adaptor with a revolvable socket dome, comprising:*

*a housing, further including thereof a bracket plate; and*

*at least a dome structure, mounted individually and revolvably at said bracket plate, each of said dome structure further having a collar shaft at one end and a dome surface at another end, said collar shaft at one end and a dome surface at another end, said collar shaft engaging with said bracket plate to form a revolvable pair, each of said dome structure further having thereof at least a socket having a plurality of contact terminals therein coupled to signal wires extending through the housing;*

*wherein each of said socket changes its facing direction as said respective dome structure revolves about said bracket plate.*

*10. The box adaptor with a revolvable socket dome according to claim 9, wherein said collar shaft further includes a groove and said bracket plate further includes a groove and said bracket plate further includes respective rack for meshing with said groove of said collar shaft.*

*11. The box adaptor with a revolvable socket dome according to claim 9, wherein a stopper pair is constructed between said dome structure and said bracket plate for defining a rotation reign of said dome structure with respect to said housing, said stopper pair further including a stopper and a respective stopper collar, said stopper constructed under said bracket plate while said stopper collar constructed at a respective location of said collar shaft;*

*in the case that said dome structure being turned to a predetermined angle, said stopper collar meeting said stopper and thus preventing said dome structure from further rotating.*

*12. The box adaptor with a revolvable socket dome according to claim 9, wherein said dome structure further includes a chip-off portion that defines said socket.*

*13. The box adaptor of claim 9, wherein the socket is eccentrically positioned on the dome structure.*

*14. The box adaptor of claim 9, wherein the socket faces away from an axis of rotation of the dome structure.*

*15. A method comprising:*

*providing a housing, further including a bracket plate;*

*providing at least a dome structure, mounted individually and revolvably at said bracket plate, each of said dome structure further having a collar shaft at one end and a dome surface at another end, said collar shaft at one end and a dome surface at another end, said collar shaft engaging with said bracket plate to form a revolvable pair, each of said dome structure further having thereof at least a socket having a plurality of contact terminals therein coupled to signal wires extending through the housing; and*

*revolving the dome structure with respect to said bracket plate such that said socket changes its facing direction.*

*16. The method of claim 15, wherein a stopper pair is constructed between said dome structure and said bracket plate for defining a rotation reign of said dome structure with respect to said housing, said stopper pair further including a stopper and a respective stopper collar, said stopper constructed under said bracket plate while said stopper collar constructed at a respective location of said collar shaft; the method further comprising:*

*revolving the dome structure with respect to said bracket plate until the stopper engages the stopper collar.*

* * * * *